United States Patent [19]

Steiner

[11] Patent Number: 5,114,382
[45] Date of Patent: * May 19, 1992

[54] WINDSHIELD DEFROSTING APPARATUS AND METHOD FOR AIRCRAFT

[75] Inventor: Norman F. Steiner, Longmont, Colo.

[73] Assignee: Air Comm Corporation, Boulder, Colo.

[*] Notice: The portion of the term of this patent subsequent to May 14, 2008 has been disclaimed.

[21] Appl. No.: 688,848

[22] Filed: Apr. 22, 1991

Related U.S. Application Data

[63] Continuation of Ser. No. 124,007, Dec. 23, 1987, Pat. No. 5,014,606.

[51] Int. Cl.$^5$ ............................................... B60H 1/00
[52] U.S. Cl. ........................................ 454/76; 454/93
[58] Field of Search ............................... 98/2.08, 2.09; 237/12.3 A, 12.3 B, 12.3 R, 2 A

[56] References Cited

U.S. PATENT DOCUMENTS 4,693,172  9/1987  Harvey ................................. 98/2.09
5,014,606  5/1991  Steiner et al. ...................... 98/2.09

OTHER PUBLICATIONS

Illustrated parts breakdown for Models 205A and 205A01 Bell Helicopter The Bell 206 Bleed Air Heat Installation Detail of Heat Lines Off Scroll engineering drawing, Mar. 1975 by Okanagan Helicopters, Ltd. of Vancouver, British Columbia.

Primary Examiner—Henry Bennett
Attorney, Agent, or Firm—Harold A. Burdick

[57] ABSTRACT

An aircraft, for example, helicopters, windshield defogger and/or deicer system is discussed which is connectable with a high pressure, high temperature air supply from the compression stage of a turbine engine. The system utilizes a Coanda-type ejector method to mix and distribute high temperature bleed air and cabin air to an existing defroster dispersal shroud fixed adjacent to the aircraft windshield.

17 Claims, 3 Drawing Sheets

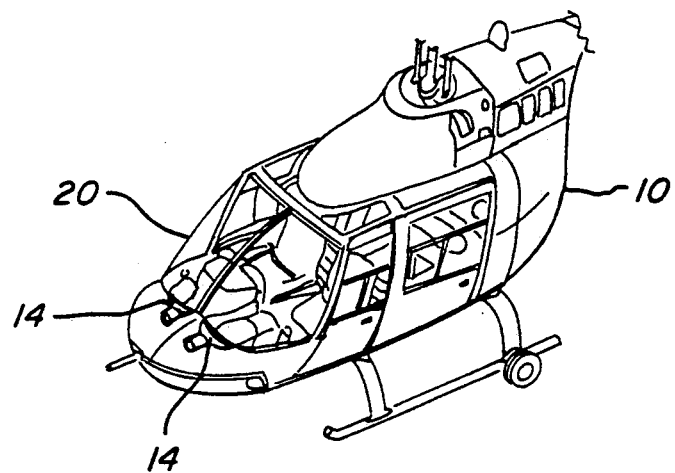
Fig_1A
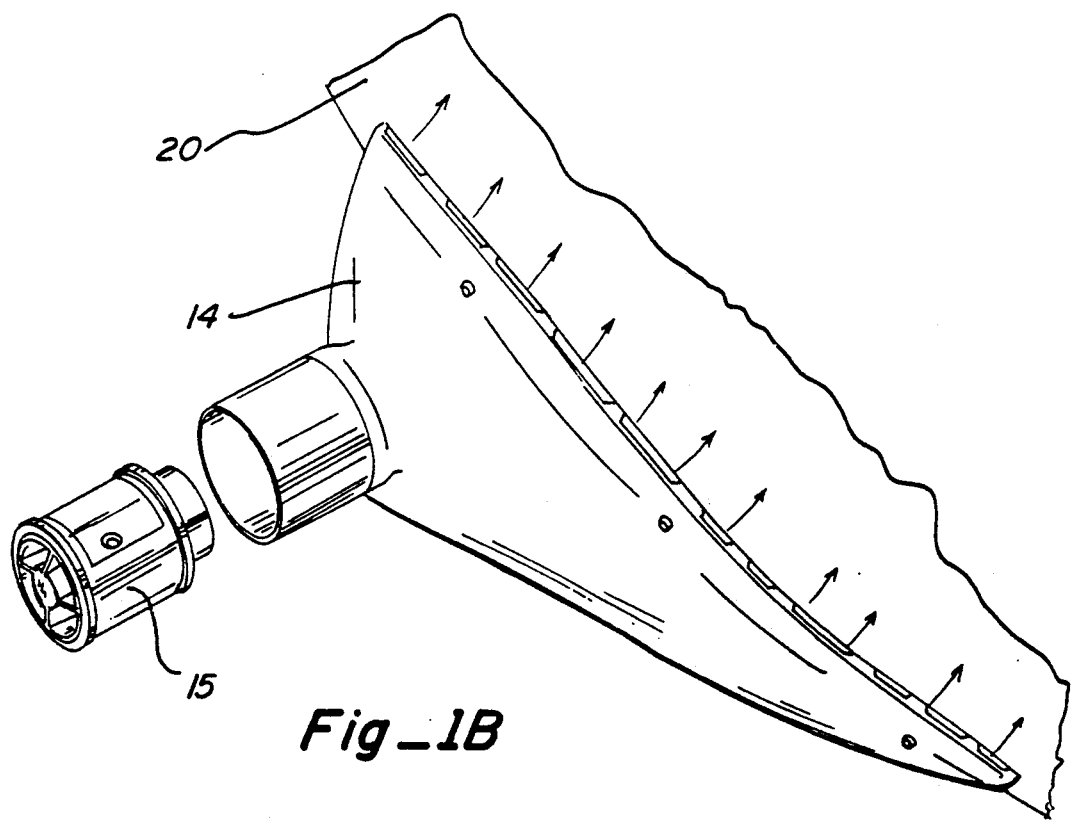
Fig_1B

WINDSHIELD DEFROSTING APPARATUS AND METHOD FOR AIRCRAFT

RELATED APPLICATION

This application is a Continuation of pending U.S. Patent application Ser. No. 07/124,007 filed Nov. 23, 1987 and entitled "WINDSHIELD DEFROSTER SYSTEM FOR THE BELL HELICOPTER TEXTRON, INC., MODEL 206 HELICOPTER AND MILITARY DERIVATIVES" now U.S. Pat. No. 5,014,606.

FIELD OF THE INVENTION

This invention relates to improvements in windshield defroster systems and, more particularly, relates to windshield defrosting apparatus and methods for aircraft such as helicopters.

BACKGROUND OF THE INVENTION

A variety of systems for providing windshield defrosting in aircraft have heretofore been suggested and/or utilized. For example, the Bell 206 helicopter has been in production since 1963. The windshield defroster system for this helicopter consists of vane axial type blowers connected to polycarbonate air dispersal shrouds.

The function of the blowers is to circulate cabin air across the windshield. There is no direct heat source for this system.

The Bell 206 windshield is particularly difficult to defrost because of its large surface area and because it is located so far forward from the cabin heater outlets. The manufacturer's defroster design is a compromise which is only partially effective.

Experience has shown this defroster system to be ineffective when the cabin air temperature is initially cold, and marginally effective when the cabin air temperature is warm. Furthermore, the circulation blowers are expensive, very noisy, and have limited service life.

Based on a review of the Federal Aviation Administration document "Summary of Supplemental Type Certificates" (any design changes to the helicopter, not incorporated by the manufacturer, must be FAA approved under authority of a supplemental type certificate) and based on common knowledge in the industry it is felt that there is no engine bleed air type defroster system of the type herein suggested available for the Bell 206 helicopter.

This invention is intended to be used in conjunction with the existing air dispersal shroud on aircraft such as the Bell 206 helicopter. The blower may be retained or discarded.

SUMMARY OF THE INVENTION

The invention overcomes the above-mentioned problem in prior art windshield defrosting for aircraft such as the Bell 206 helicopter by providing a unique, simple and inexpensive source of heat and airflow on the windshield. The defroster system includes a bleed air tube, an on-off ball valve and a Coanda/ejector airmover. When the ball valve is opened, high pressure, high temperature bleed air is allowed to exhaust through the Coanda/ejector airmover into the existing defroster air dispersal shroud. Cabin air is thereby pulled into the shroud, mixed with the bleed air, and exhausted over the windshield as warm air to effect the defrosting-defogging of the windshield.

BRIEF DESCRIPTION OF THE DRAWINGS

FIGS. 1A and B are perspective views of the existing Bell 206 defroster system (FIG. 1B is an exploded view);

DESCRIPTION OF THE INVENTION

The Bell Model 206 helicopter 10 is shown in FIG. 1. In this connection the helicopter is provided with existing air dispersal shrouds 14 which are mounted at the base of the windshield 20. Each shroud is equipped with a vane-axial type blower 15.

Figure 2:
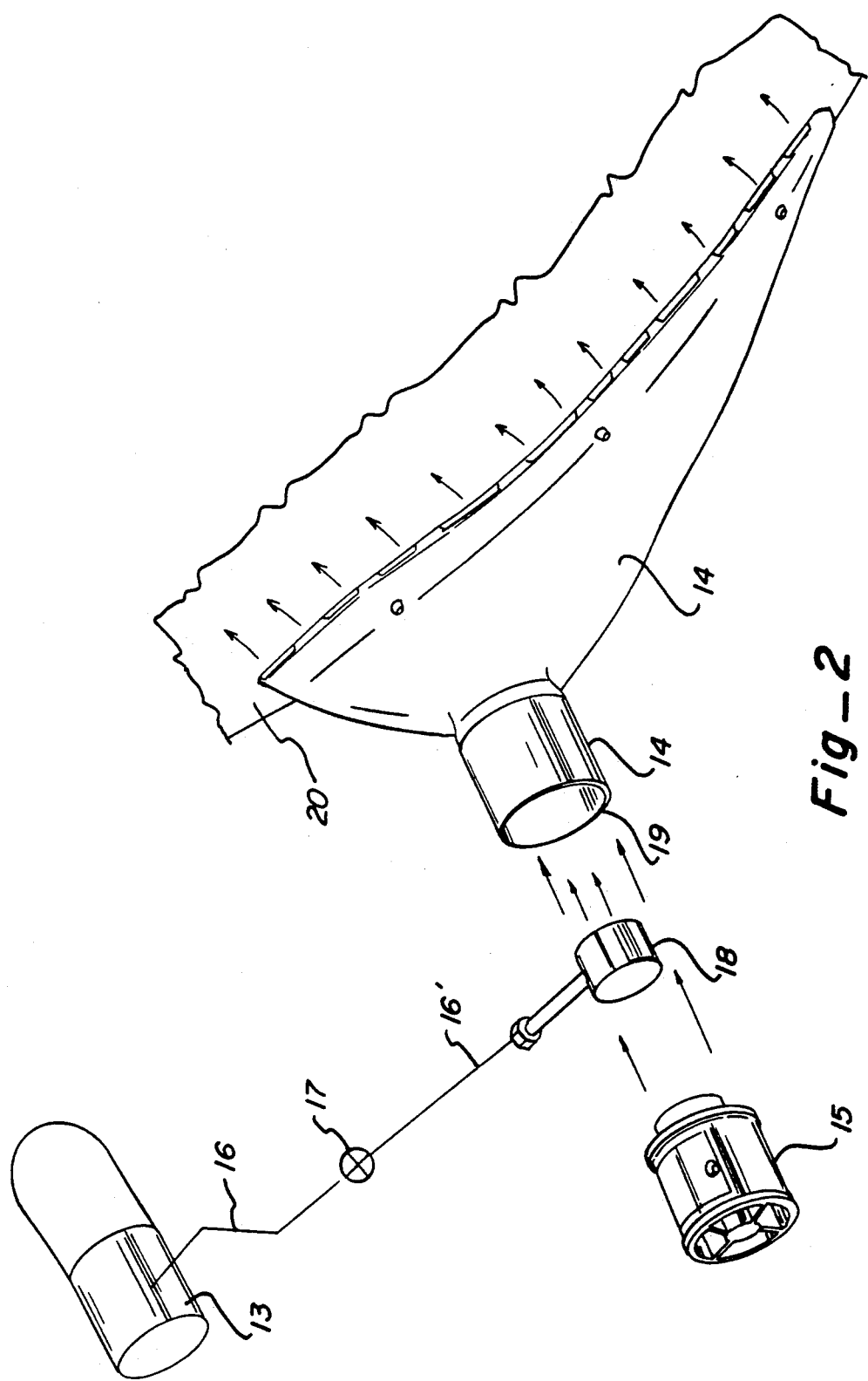
FIG. 2 is a perspective exploded view of the bleed air defroster system in combination with existing blower.
Figure 3:
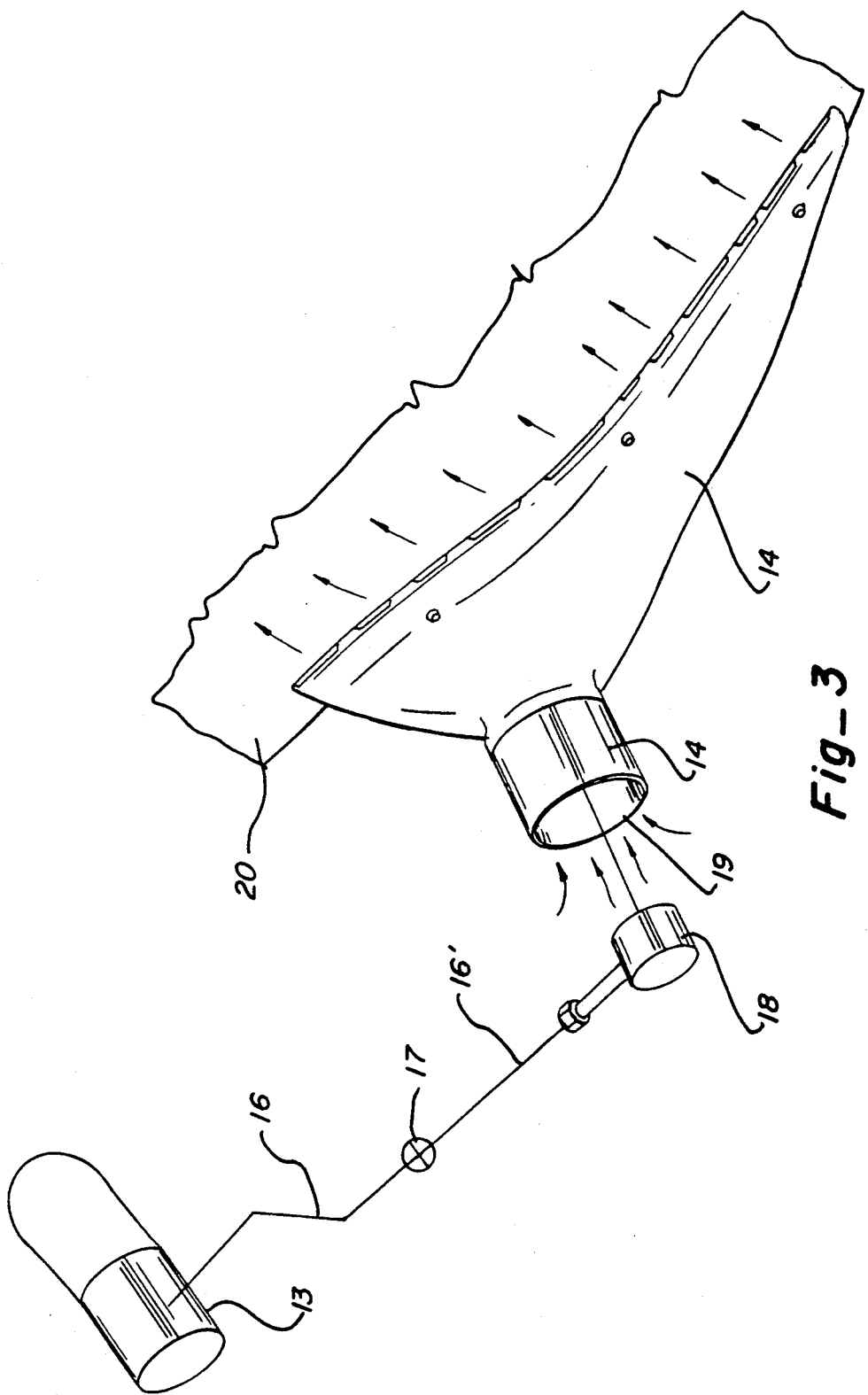
FIG. 3 is a perspective exploded view of the bleed air defroster system with the existing blower deleted.

For use with this invention as shown in FIGS. 2 and 3, high temperature, high pressure air is piped from the compressor stage of the helicopter turbine engine 13 through a metal tube 16. The defroster system is activated by manually opening a valve 17 (for example a ball valve). A Coanda/ejector type airmover 18 is connected with valve 17 by connection line 16' and is positioned in, or in close proximity of, each defroster shroud inlet 19 so as to also pump cabin air into the shroud. The action of the ejector 18 (expelling high pressure, high temperature air into inlet 19) causes the cabin air to be drawn into inlet 19 and mixed with the hot engine bleed air at shroud 14 and to be exhausted from shroud 14 over the windshield.

Defroster blower 15 is not a required part of the invention and may be discarded, or it may be retained to cause further movement of cabin air into inlet 19.

What is claimed is:

1. A defrosting apparatus for aircraft having an engine providing a high pressure, high temperature air supply source, a windshield, and an existing air disperser adjacent to the windshield for distributing air at the windshield, the disperser having an air inlet, said apparatus comprising expelling means connectable with the supply source of high pressure, high temperature air and positionable adjacent to the inlet of the disperser for expelling high pressure, high temperature air into the inlet so that cabin air is also drawn into the inlet, mixed in the disperser with the high temperature air and distributed as warm air from the disperser of the windshield.

2. The apparatus of claim 1 further comprising activating means for activating flow of air from the supply source to said expelling means.

3. The apparatus of claim 2 further comprising connecting means for connecting said activating means with said expelling means.

4. The apparatus of claim 2 wherein said activating means is a ball valve.

5. The apparatus of claim 1 wherein said expelling means is a Coanda-type air mover.

6. The apparatus of claim 1 wherein said apparatus is particularly adapted for use with a Bell Helicopter Model 206 type helicopter.

7. A defrosting apparatus for aircraft having an engine providing a high pressure, high temperature air supply source and a windshield, said apparatus comprising:

an air dispersal shroud adjacent to the windshield for distributing air at the windshield, the shroud having an air inlet;

an ejector connectable with the supply source of high pressure, high temperature air and positionable adjacent to the inlet of the shroud to expel high pressure, high temperature air into the inlet so that cabin air is also drawn into the inlet, mixed in the shroud with the high temperature air and distributed as warm air from the shroud at the windshield; and means for connecting said ejector with the high pressure, high temperature air supply source.

8. The apparatus of claim 7 further comprising a blower positioned adjacent to said inlet of said shroud to supplement cabin air flow into said inlet.

9. The apparatus of claim 7 further comprising a manually actuated valve connectable with said means for connecting said ejector and with the air supply source.

10. The apparatus of claim 7 wherein said ejector is a Coanda-type air mover.

11. The apparatus of claim 7 wherein said apparatus is particularly adapted for use with a Bell Helicopter Model 206 type helicopter.

12. A method for defrosting a windshield of an aircraft, the aircraft having an engine providing a high pressure, high temperature air supply source and an existing air disperser adjacent to the windshield for distributing air at the windshield, the disperser having an inlet, said method comprising the steps of directing high pressure, high temperature air from the supply source to a position adjacent to the inlet of the disperser, and expelling the high pressure, high temperature air into the inlet so that cabin air is also drawn into the inlet, mixed in the disperser with the high temperature air and distributed as warm air from the disperser at the windshield.

13. The method of claim 12 further comprising manually activating flow of high pressure, high temperature air to the inlet.

14. The method of claim 12 wherein the step of expelling air includes ejecting air from a position adjacent to the inlet.

15. The method of claim 12 further comprising the steps of providing an ejector having a connecting line, and removing an existing air mover at said inlet of said disperser and positioning said ejector thereat and connecting said connecting line with said air supply source.

16. The method of claim 15 further comprising providing a valve and connecting said valve between said connecting line and said air supply source.

17. The method of claim 15 wherein said steps are particularly adapted for performance on a Bell Helicopter Model 206 type helicopter.

* * * * *